(12) United States Patent
Miyagoshi et al.

(10) Patent No.: US 6,549,671 B1
(45) Date of Patent: Apr. 15, 2003

(54) PICTURE DATA ENCODING APPARATUS WITH BIT AMOUNT ADJUSTMENT (75) Inventors: Eiji Miyagoshi, Katano (JP); Akihiro Watabe, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/250,091

(22) Filed: Feb. 16, 1999

(30) Foreign Application Priority Data

Feb. 19, 1998 (JP) ............................................ 10-037604

(51) Int. Cl.[7] .............................. G06K 9/36; H03M 7/00
(52) U.S. Cl. ......................... 382/239; 382/245; 341/50
(58) Field of Search ................................ 382/232, 239, 382/245, 246; 341/61, 106, 50, 63; 375/240

(56) References Cited

U.S. PATENT DOCUMENTS

| 5,402,123 | A | * | 3/1995 | Jung ............................ 341/63 |
| 5,657,015 | A | * | 8/1997 | Nakajima et al. .............. 341/61 |
| 5,793,897 | A | * | 8/1998 | Jo et al. ....................... 382/246 |
| 5,831,559 | A | * | 11/1998 | Agarwal et al. ............. 341/106 |
| 5,952,943 | A | * | 9/1999 | Walsh et al. ................... 341/50 |
| 6,088,392 | A | * | 7/2000 | Rosenberg ................... 375/240 |

FOREIGN PATENT DOCUMENTS

JP        8-154232        6/1996        ............ H04N/5/92

OTHER PUBLICATIONS

"Transcoding of Single–layer MPEG video into lower rates," Assuncao, P.A.A., et al. IEE proc.–Vis. Image Signal Process., vol. 144, No. 6, Dec. 1997, pp. 377–383.*
Patent Abstracts of Japan, publication No. 08154232A, published Jun. 11, 1996.

* cited by examiner

Primary Examiner—Wenpeng Chen
(74) Attorney, Agent, or Firm—Rosenthal & Osha L.L.P.

(57) ABSTRACT

A picture data encoding apparatus includes a target bit amount determining part for calculating a target bit amount for each block according to a bit rate and a number of blocks to be converted; and a bit amount adjusting part for reducing a bit amount for each block to the target bit amount by means of reducing the bit amount for each code by converting run level information for each code into lower run level information.

14 Claims, 10 Drawing Sheets

| | |
|---|---|
| Macro block layer | Macro block escape<br>Macro block address incremant<br>Macro block type<br>Quantization scale<br>Motion horizontal forward code<br>Motion horizontal forward r<br>Motion vertical backward code<br>Motion vertical backward r<br>Code block pattern (CBP) |
| Block layer | DCT coefficient<br>End of block code (EOB) |

PICTURE DATA ENCODING APPARATUS WITH BIT AMOUNT ADJUSTMENT

BACKGROUND OF THE INVENTION

1. Field of the Invention

This present invention relates to a picture data encoding apparatus for transmitting the encoded data by adjusting the transfer rate of the encoded data according to the bit rate of the receiver media. Here, the concept of the media in the present invention includes a data carrier such as a storage media and network.

2. Description of the Related Art

Recently, a digital storage system and storage media such as DVD (digital video disc) has been developed and available in practical use. Such storage system and media can store more than 120 minutes of picture image data onto a laser disc whose size is the same as that of the conventional CD-ROM with the same quality level of S-VHS standard accomplished by the improvement of the available density and massive volume of the storage media and by developing of the digital moving picture compression technology such as MPEG 2 (Moving Picture Experts Group 2). Moreover, for the storage media in which random access is available such as DVD, reproduction (data copy) is easier than in magnetic tape storage media. Therefore, it is greatly excellent in the mass production ability for the software products.

On the other hand, the progress of the digital technology achieves great progress in the broadcasting field. In a part of broadcasting media, data distribution applying digital moving picture compression technologies such as MPEG 2 enters in a practical use stage, and it is thought that DVD will be used for a video server of the broadcasting station in the future. In general, a fixed rate transmission is applied to broadcasting data transmission because it is necessary to achieve economical operation in the transmission line by reducing the transfer rate per a channel as much as possible. Encoding rule used in MPEC, a predetermined constant bit amount is assigned to each I picture (Intraframe picture hereinafter referred to as "I picture"), P picture (Predictive picture. hereinafter referred to as "P picture"), B picture (Bidirectionally Predictive picture hereinafter referred to as "B picture") as a target bit amount respectively by applying the fixed rate encoding, and rate control is performed for closing each encoding bit amount to the corresponding target bit amount asymptotically.

On the other hand, the variable rate encoding technology is used in a digital storage media such as DVD. The variable rate encoding achieves the high quality encoding with efficient data compression by assigning a large amount of bits to the complex picture with a dynamic movement of the object between frames and a small amount of the bits to the simple picture with a static movement.

When transmitting the data on the storage media such as DVD which employs the variable rate encoding technology by utilizing a transmission media of fixed rate, the correspondence might not be able to be maintained. In the conventional technology, the encoded data with a variable rate is re-encoded with a fixed rate in advance before the data transmission. In other word, one method for performing above mentioned transmission is that the data encoded with variable rate stored in the DVD should be decoded once, then those decoded picture data are re-encoded with fixed rate again by the digital motion picture compression apparatus. After those decoding and re-encoding processing, those modified data can be transmitted through the fixed rate transmission line.

Also in the conventional technology, when transmitting and recording the encoded data from the media for high bit rate to the media for low bit rate, the encoded data also should be decoded once, then those decoded picture data are re-encoded with low bit rate for receiver again by the digital motion picture compression apparatus and those modified data are transmitted to the receiver media.

As shown above, according to the above mentioned conventional technology, the following additional apparatuses will be necessary. One is a coded picture data decoding apparatus for decoding the encoding data stored on the sender media once. The other apparatus is a picture data re-encoding apparatus for encoding those decoded picture data with the bit rate employed in a receiver media (designation media).

As a result, there are problems in the conventional technology that the manufacturing cost is boosted up and the additional processing steps are increased.

SUMMARY OF THE INVENTION

Therefore, with the foregoing in mind, it is an object of the present invention to provide a picture data encoding apparatus for transmitting data by converting the encoded data with variable rate to the encoded data with fixed rate without employing the re-encoding method.

Another object of the present invention is to provide a picture data encoding apparatus for transmitting encoded data between two media which are different in bit rate by reducing and adjusting the bit rate within the bit rate for the receiver media without employing the re-encoding method.

In order to achieve above mentioned objects, the picture data encoding apparatus of the present invention includes a target bit amount determined means for calculating a target bit amount for each block according to the bit rate and the number of blocks to be converted. In addition, a bit amount adjusting means is included. The bit amount adjusting means counts the amount of the bit stream, adds the end of block (hereinafter referred to as "EOB") code which indicates the end of the block into the block data when the counted amount of the bit stream reaches the target bit amount and deletes the encoding data following the added EOB code.

By this embodiment, the picture data encoding apparatus can perform bit amount adjustment for each block by the bit amount adjusting means by utilizing the EOB. The picture data encoding apparatus can adjust the transfer bit rate of the encoded data to the bit rate for the receiver media by adjusting the bit amount for each block by simple system configuration without decoding the code.

Next, in another embodiment, the picture data encoding apparatus includes a target bit amount determined means for calculating a target bit amount for each macro block according to the bit rate and the number of macro blocks to be converted. In addition, another bit amount adjusting means is included. The bit amount adjusting means counts the amount of the bit stream, modifies the code block pattern (hereinafter referred to as "CBP") which shows the macro block information when the counted amount of the bit stream reaches the target bit amount, and deletes the encoded data of the macro block whose CBP has been modified.

By this embodiment, the picture data encoding apparatus can perform bit amount adjustment for each macro block by the bit amount adjusting means by modifying CBP. The picture data encoding apparatus adjusts the transfer bit rate of the encoded data to the bit rate for the receiver media by adjusting the bit amount for each macro block by simple system configuration without decoding the code.

Next, in another embodiment, the picture data encoding apparatus includes a target bit amount determined means for calculating a target bit amount for each block according to the bit rate and the number of blocks to be converted. In addition, another bit amount adjusting means is included. The bit amount adjusting means reduces the bit amount for each block to the target bit amount by means of reducing the bit amount assigned for each code by converting the run level information for each code into lower run level information.

By this embodiment, the picture data encoding apparatus can perform bit amount adjustment for each block by the bit amount adjusting means by reducing the run level information. The picture data encoding apparatus adjusts the transfer bit rate of the encoded data to the bit rate for the receiver media by adjusting the bit amount for block by simple system configuration without decoding the code.

Next, in another embodiment, the picture data encoding apparatus includes a target bit amount determined means for calculating a target bit amount for each macro block according to the bit rate and the number of macro blocks to be converted. In addition, another bit amount adjusting means is included. The bit amount adjusting means reduces the bit amount for each macro block to the target bit amount by means of reducing the bit amount for each code by converting the run level information for each code into lower run level information.

By this embodiment, the picture data encoding apparatus can perform bit amount adjustment for each macro block by the bit amount adjusting means by reducing the run level information. The picture data encoding apparatus adjusts the transfer bit rate of the encoded data to the bit rate for the receiver media by adjusting the bit amount for each macro block by simple system configuration without decoding the code.

The bit amount adjustment means preferably performs the bit amount adjustment only to the code in the vicinity of the end of block code.

By this embodiment, the picture data encoding apparatus can keep the picture quality high by applying bit amount adjustment process only to the code located in the vicinity of the EOB code which becomes a high frequency component according to the character of DCT coefficient.

Next, the bit amount can be reduced by repeating the processing of the bit amount adjustment means.

By this embodiment, in case that the target bit rate adjustment can not be achieved by one time bit adjustment processing for each code, the target bit rate can be achieved surely by performing the bit adjustment processing several times until the target bit rate is achieved.

Next, the target bit amount determination means calculates the target bit amount for the B picture in order to achieve the bit amount rate conversion only by reducing the bit amount of the B picture without reducing the bit amount of the I picture and the P picture. The bit amount adjustment means reduces only the bit amount of the B picture according to the calculated target bit amount for the B picture.

By this embodiment, because the I picture data and the P picture data are invariable, deterioration in the picture quality can be suppressed.

Next, when the bit rate is a fixed rate, and the bit rate for the receiver media is higher than the bit rate for sender media, the bit amount adjustment means adjusts and transfers the data by converting the variable rate encoded data into the fixed rate encoded data by adding the dummy data.

By this embodiment, data can be transmitted by converting the variable rate encoded data into the fixed rate encoded data for the receiver media.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention of the picture data encoding apparatus will be described by way of embodiments with reference to the accompanying drawings.
Embodiment 1

In this embodiment 1, first, a basic operation of the picture data encoding apparatus of this invention is described, then an example configuration of the apparatus which utilizes EOB (End of block code) as a bit amount adjustment means is described as a concrete embodiment. As described later, other embodiments of the apparatus which use other bit amount adjustment means are described in the following embodiments.

Figure 1:
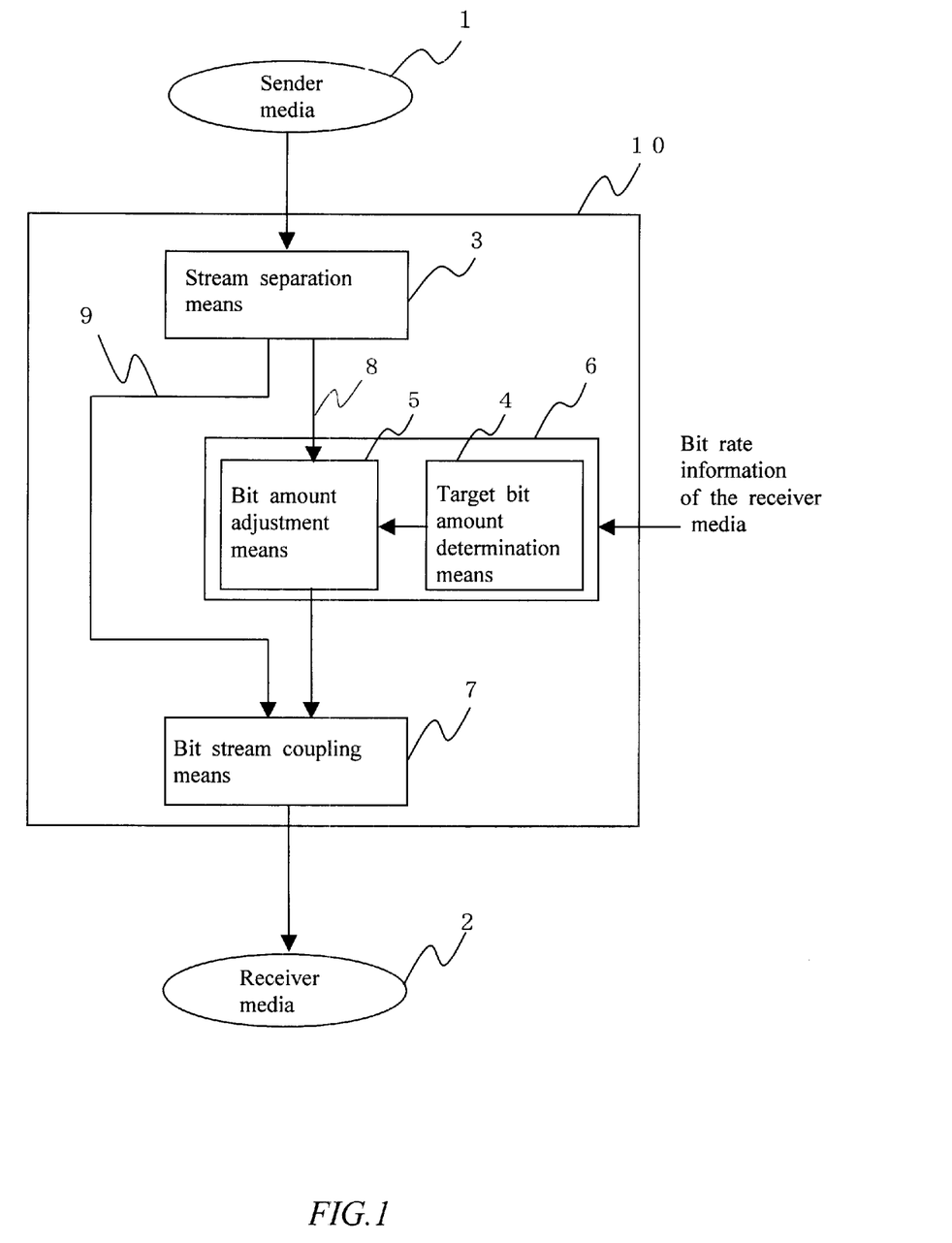
FIG. 1 is a schematic block diagram showing a basic operation of the picture data encoding apparatus of the present invention.

First of all, a basic operation of the picture data encoding apparatus of this invention is described. FIG. 1 is a schematic block diagram showing a basic operation of the picture data encoding apparatus of the present invention. The outline of the process of transmitting the encoded data between two media with two different bit rates by using the picture data encoding apparatus of this invention is shown. 1 is a sender media, 2 is a receiver media. The form of media is not limited to specific media. A digital record media such as DVD and a hard disc drive, or a network media such as a cable, are available. Regarding the transfer rate of sender media 1 and receiver media 2, either variable rate or fixed rate is available. In addition, regarding data, not only picture data but also audio data may be included. 3 indicates a bit stream separation means for separating inputted encoded data to video stream 8 and audio stream 9. In the following description, generally speaking, the compression of the audio data employs a fixed rate, and data amount is at most 100 k bit per second. Therefore, the processing for the audio data is omitted and the processing for the video data is mainly described in this embodiment.

6 indicates a picture data encoding apparatus of this invention which includes a target bit amount determination means 4 and a bit amount adjustment means 5. 7 indicates a bit stream coupling means for coupling and margining the separated video stream 8 and audio stream 9. 10 indicates a module of the entire apparatus which applies the picture data encoding apparatus 6 of this invention.

When the encoded data is inputted from the sender media 1 to module 10, the inputted encoding data is separated into the video stream 8 and the audio stream by the stream separation means 3, and the video stream 8 is inputted to the picture data encoding apparatus 6. A detailed configuration of the picture data encoding apparatus 6 and its operation are described later by using FIG. 2. The outline of the processing operation of the picture data encoding apparatus 6 is as follows. The amount of the target bit is determined by the target bit amount determination means 4 according to the bit rate for the receiver media 2 and the number of blocks to be converted in advance. The amount of the bit is adjusted by the bit amount adjustment means 5 based on the comparison result of the bit rate of the inputted encoded data and the predetermined amount of the target bit. The data can be converted into predetermined fixed bit rate. After adjusting and converting the data, modified data are outputted to the stream coupling means 7. When the bit amount adjustment is not necessary according to the comparison result, data are outputted to the stream coupling means 7 without adjusting the bit amount. The stream coupling means 7 couples and merges the video stream 8 and audio stream 9. After coupling, the encoded data is outputted to the receiver media 2.

The above-mentioned bit amount adjustment is performed as follows.

(1) When the bit rate of the inputted encoded data is larger than the bit rate for receiver media 2, the bit amount of the inputted encoded data will be reduced to the amount of the bit rate for the receiver media 2 by the bit adjustment means 5.

(2) When the receiver media 2 employs a variable rate and the bit rate of the inputted encoded data is below the bit rate of the receiver media 2, the bit amount adjustment by the bit adjustment means 5 does not perform, and the encoded data will be outputted through the bit adjustment means 5.

(3) When the receiver media 2 employs a fixed rate, and the bit rate of the inputted encoded data is below the bit rate for the receiver media 2, the bit amount is adjusted by adding the dummy data to the encoded data up to the fixed bit rate for the receiver media 2 by the bit adjustment means 5.

The above mentioned processing are the basic operation of the picture data encoding apparatus of this invention.

As for the bit adjustment means 5, plural variations are possible according to the processing unit and the bit amount adjusting method. This embodiment 1 shows the example configuration for reducing the bit amount by assuming the processing unit is a block unit, providing the target bit amount for each block of the encoding data, and using EOB as follows.

Figure 4:
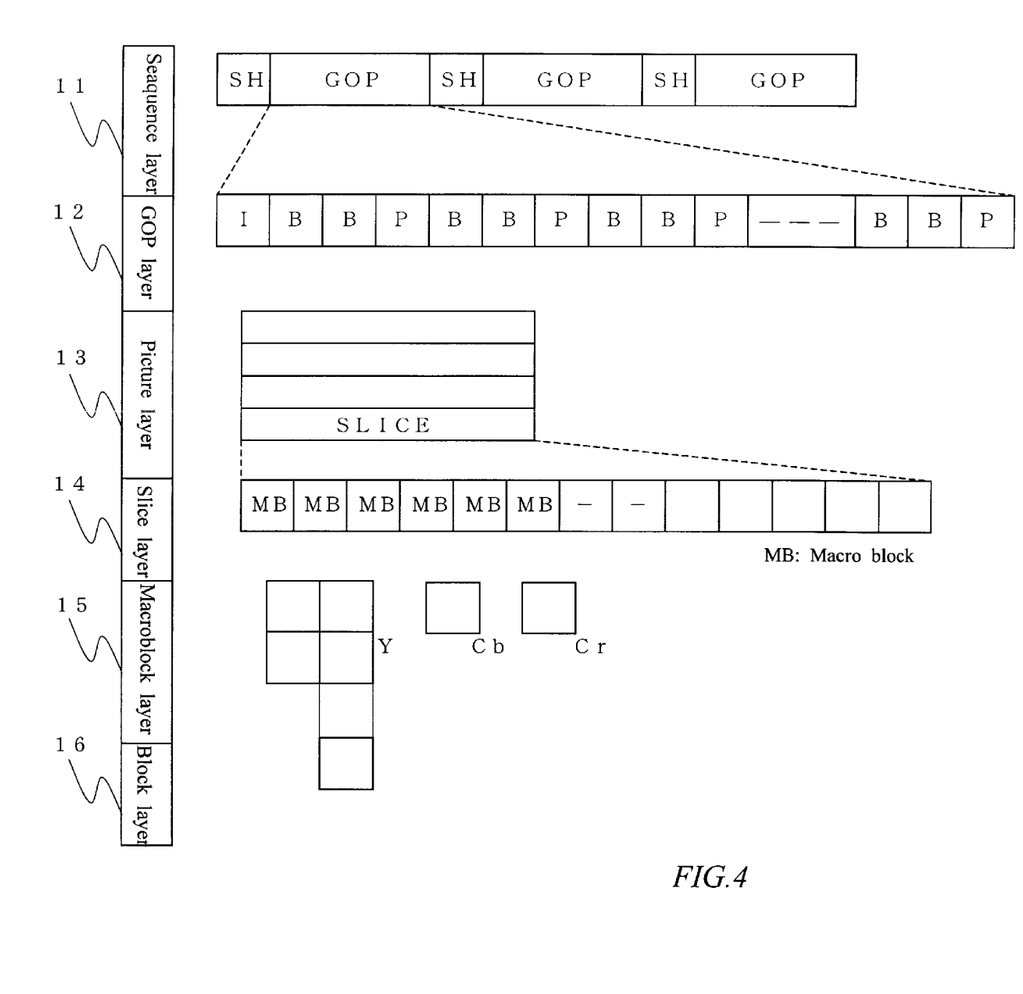
FIG. 4 is a schematic diagram showing an example of data structure of video stream 8.

Here, EOB is described in detail. FIG. 4 shows an example of the data structure of the video stream 8. This is a widely used data format in MPEG etc. The bit stream of the video data is composed of sequence layer 11, GOP (group of pictures) layer 12, picture layer 13, slice layer 14, macro block layer 15, and block layer 16 as shown in FIG. 4. The sequence layer 11 describes the screen format etc. The GOP layer 12 generally shows the minimum unit of the group on the screen for the unit of the random access. The picture layer 13 provides common attribute to the screen of the one sheet containing information such as encoding mode (picture types such as intra mode and the inter mode). The slice layer 14 contains common information for small screen areas which are the small area of one frame divided by the arbitrary length (for instance, quantization characteristic). The macro block layer 15 contains information for the motion vector value for instance. The block layer 16 contains picture data. Most part of the picture data is stored in this block layer 16. The EOB code which indicates the end of the data in this block is included in this block layer 16. The picture data encoding apparatus of this Embodiment 1 adjusts the amount of the bit in the block layer 16 by utilizing this EOB. In other words, the picture data encoding apparatus adjusts the whole bit amount of the video stream 8 by adjusting the bit amount by each block unit.

Figure 2:
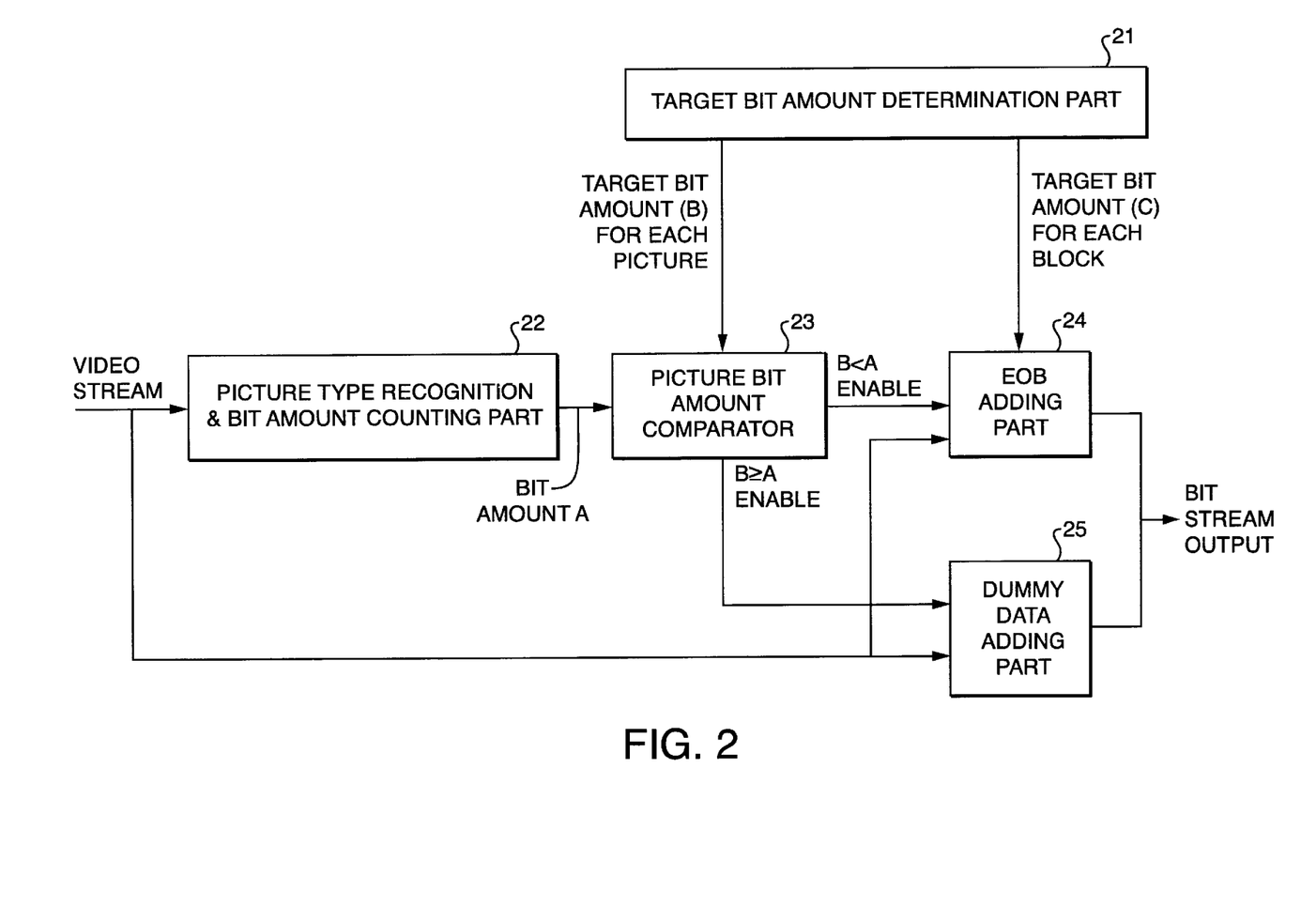
FIG. 2 is a schematic block diagram showing the details of the picture data encoding apparatus of the first embodiment.
Figure 3:
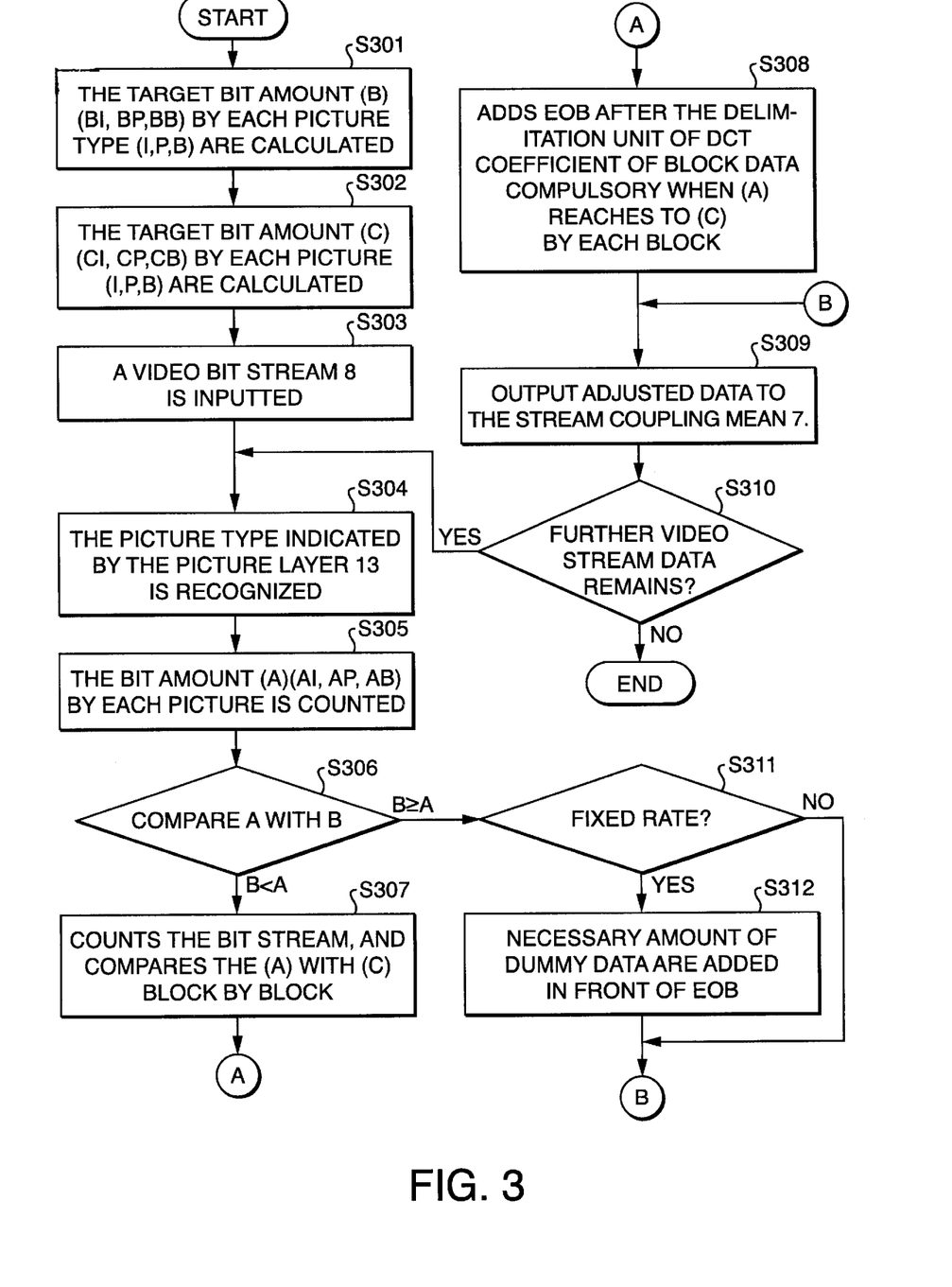
FIG. 3 is a flow chart showing a procedure of the picture data encoding apparatus of the first embodiment.

FIG. 2 is a schematic block diagram showing the details of the picture data encoding apparatus 6 of this first embodiment. FIG. 3 is a flow chart showing a procedure of the picture data encoding apparatus 6 of the Embodiment 1.

In this FIG. 2, 21 indicates a target bit amount determination part, 22 indicates a picture type recognition & bit amount counting part, 23 indicates a picture bit amount comparator, 24 indicates a EOB adding part, 25 indicates a dummy data adding part. The target bit amount determination part 21 corresponds to the target bit amount determination means. The picture type recognition & bit amount counting part 22, the picture bit amount comparator 23, the EOB adding part 24 and the dummy data adding part 25 corresponds to the bit amount adjustment means.

The target bit amount determination part 21 inputs the bit rate information of the receiver media 2 in advance, calculates and preserves the following set of information for each picture type. One is a target bit amount (B) for each picture unit, the other is a target bit amount (C) for each block unit.

The picture type recognition & bit amount counting part 22 detects the picture type of the processing picture data from information in the bit stream 8 and counts the bit amount (A) of this picture.

The picture bit amount comparator 23 compares the counted bit amount (A) with the target bit amounts (B) of the picture type and outputs an enable signal according to the comparison result.

The EOB adding part 24 turns to enable status when A>B in the comparison processing by the picture bit amount comparator 23. The EOB adding part 24 counts the bit amount of the bit stream by block unit, compares the counted bit amount with the block target bit amount (C). When the counted bit amount reaches to the block target bit amount (C), the EOB adding part 24 adds the EOB which indicates the end of the block data into the current position of the bit stream compulsory, and deletes the following data of the bit stream.

The dummy data adding part 25 turns to enable status when B≧A in the comparison processing by the picture bit amount comparator 23, counts the bit amount of the bit stream by block unit, compares the counted bit amount with the block target bit amount (C). When EOB is detected though the counted bit amount does not reach the block target bit amount (C), the dummy data adding part 25 adds the dummy data to the following part of the bit stream compulsory, and adjusts the bit amount of the block up to the block target bit amount (C).

FIG. 3 is a flow chart showing a procedure of the picture data encoding apparatus 6 of the first embodiment.

In step S301, the target bit amount (B) (BI, BP, BB: hereinafter, subscription I P B mean picture type) by each picture type (I, P, B) are calculated by the target bit amount determination part 21 based on the bit rate information for the receiver media 2.

Next, the target bit amount (C) (CI, CP, CB) by each block of each picture type (I,P,B) are calculated by the target bit amount determination part 21 (step S302). Here, the target bit amount (C) (CI, CP, CB) by each block is calculated by following (Equation 1) to (Equation 3).

$$CI=BI/\{(\text{horizontal macro block number}) \times (\text{vertical direction macro block number}) \times 6\} \quad [\text{Equation 1}]$$

$$CP=BP/\{(\text{horizontal macro block number}) \times (\text{vertical direction macro block number}) \times 6\} \quad [\text{Equation 2}]$$

$$CB=BB/\{(\text{horizontal macro block number}) \times (\text{vertical direction macro block number}) \times 6\} \quad [\text{Equation 3}]$$

The coefficient of "6" of the above-mentioned (Equation 1)–(Equation 3) is decided corresponding to the block number included in one macro block, which is composed of six blocks as shown in FIG. 4.

It is possible to perform the above-mentioned step S301–S302 in advance as a preprocessing.

Next, in step 303, a video bit stream is inputted from the sender media 1 through stream separation means 3.

In step 304, the picture type indicated by the picture layer 13 is recognized by the picture type recognition & bit amount counting part 22, and the picture type of the inputted bit stream is detected whether I picture, P picture, or B picture.

In step 305, the bit amount (A) (AI, AP or AB) by each picture is counted by the picture type recognition & bit amount counting part 22.

In step 305, the target bit amount (B) (BI, BP, or BB) indicated by the target bit amount determination part 21 is compared with the actual bit amount (A) (AI, AP, AB) counted in step 306 by the picture bit amount comparator 23 according to the detected picture type.

As a result of the comparison in step 306, when B<A, an enable signal is outputted to the EOB adding part 24 because the bit amount reducing process will be required. The process shifts to step 307.

In step 307, bit stream data, an enable signal and the target bit amount (C) (CI, CP, CB) by the block according to the picture type are inputted to the EOB adding part 24. EOB adding part 24 counts the flowing bit stream, and compares the counted bit amount with the target bit amount (C) block by block.

In step 308, the EOB adding part 24 adds EOB after the delimitation unit of DCT coefficient of block data compulsory when the counting bit amount of the block reaches to the target bit amount (C) by each block. By this processing, following data in the block will be deleted and the coded data can be converted to the video stream 8 with the bit rate for the receiver media 2.

In step 309, the processed data after bit amount adjustment are outputted to the stream coupling mean 7. If there remains further video stream data to be processed, return to step 304. If there is no data to be processed, the process will be finished (step S310).

On the other hand, if B≧A as a result of the comparison in step 306, the bit rate type of the receiver media 2 is detected whether a fixed bit rate or not in step 311. If the bit rate is the fixed bit rate, the bit amount should be adjusted to the bit amount (A). Therefore, a necessary amount of dummy data will be added in front of the EOB as the bit amount of the picture becomes equal to the target bit amount (A) (step 312). After dummy data addition, the adjusted data is outputted through the stream coupling means 7.

By the above mentioned step 301 to step 312, the bit rate of the encoded data can be converted to the bit rate for the receiver media 2 by the simple processing without decoding and re-encoding the encoded data.

Embodiment 2

Hereinafter, the picture data encoding apparatus of the embodiment 2 of the present invention will be described with reference to the accompanying drawings. Regarding the bit amount adjustment means described in this embodiment 2, a macro block is selected as a processing unit, and the CBP is utilized for bit amount adjustment.

Figure 5:
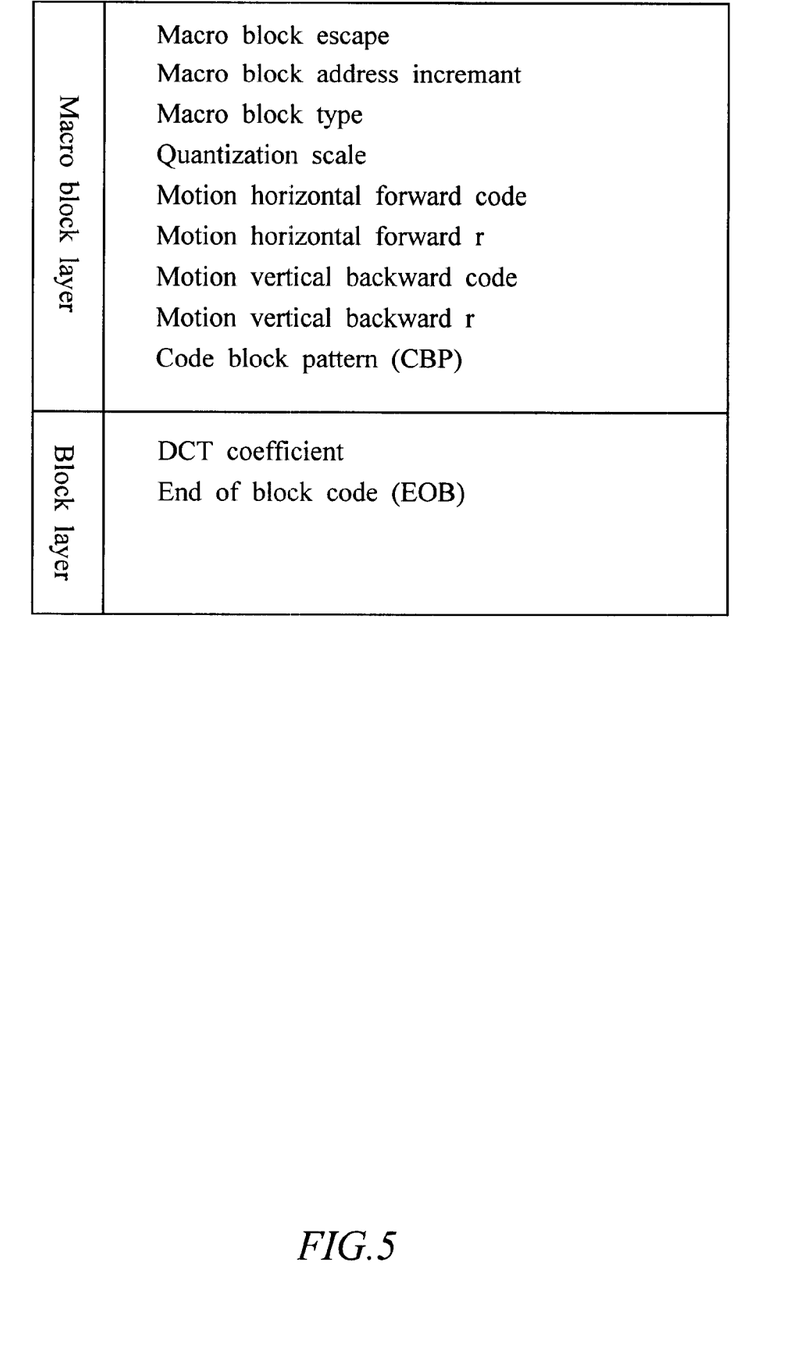
FIG. 5 is a schematic diagram showing an example of the relationship between the macro block and the block layer.

First of all, CBP is described in detail. FIG. 5 is a schematic diagram showing an example of relation between macro block and block layer. Here, data and the format included in the macro block layer 15 and the block layer 16 are the same as that used in MPEG etc. As shown in FIG. 5, the macro block layer composed of the Macroblock Escape, the Macroblock Address Increment, the Macro block type, the Quantization scale, the Motion Horizontal Forward Code, the Motion Horizontal Forward r, the Motion Vertical Backward Code, the Motion Vertical Backward r, the CBP, the DCT coefficient, the End of Block. The macro block escape corresponds to as many as 33 macro block skips. The macro block address increment indicates the position of the macro block in the slice layer 14. The macro block type indicates the encoding mode in the macro block. The quantization scale indicates the step width of the quantization for the macro block.

The motion Horizontal Forward code indicates the forward element of the motion vector, the motion Horizontal Forward code r indicates the horizontal element of the motion vector, the Motion Vertical Backward Code indicates the vertical element of the motion vector, the Motion Vertical Backward r describes the backward element.

CBP indicates whether six blocks in the macro block have the coefficient or not. DCT coefficient is the data calculated by following step. First, bit stream data is quantized and translated by DCT, then encoded by the run length encoding, then encoded by a Huffman code encoding. Here, the run length encoding is an encoding process for dividing the DCT translated data by a series of the coefficient "0" data set and following encoding level. The Huffman code encoding is an encoding process for assigning a short encoding code to the data whose incidence is high statistically. On the contrary, assigning a long encoding code to the data whose incidence is low statistically. By this code data length weighing, the compression efficiency can be improved. The EOB indicates the end of the encoded block data, and indicates the data following the EOB are regarded as "0".

The bit amount adjustment means of this Embodiment 2 utilizes the CBP in the information of the macro block in order to reduce the encoded data of the block. When the total bit amount of the macro block reaches to the target bit amount, CBP is changed. Then the bit amount adjustment means deletes the encoded data of which CBP has been changed. By this way, the bit amount can be adjusted by the macro block unit and the whole bit amount of the video stream 8 can be adjusted as a result.

Figure 6:
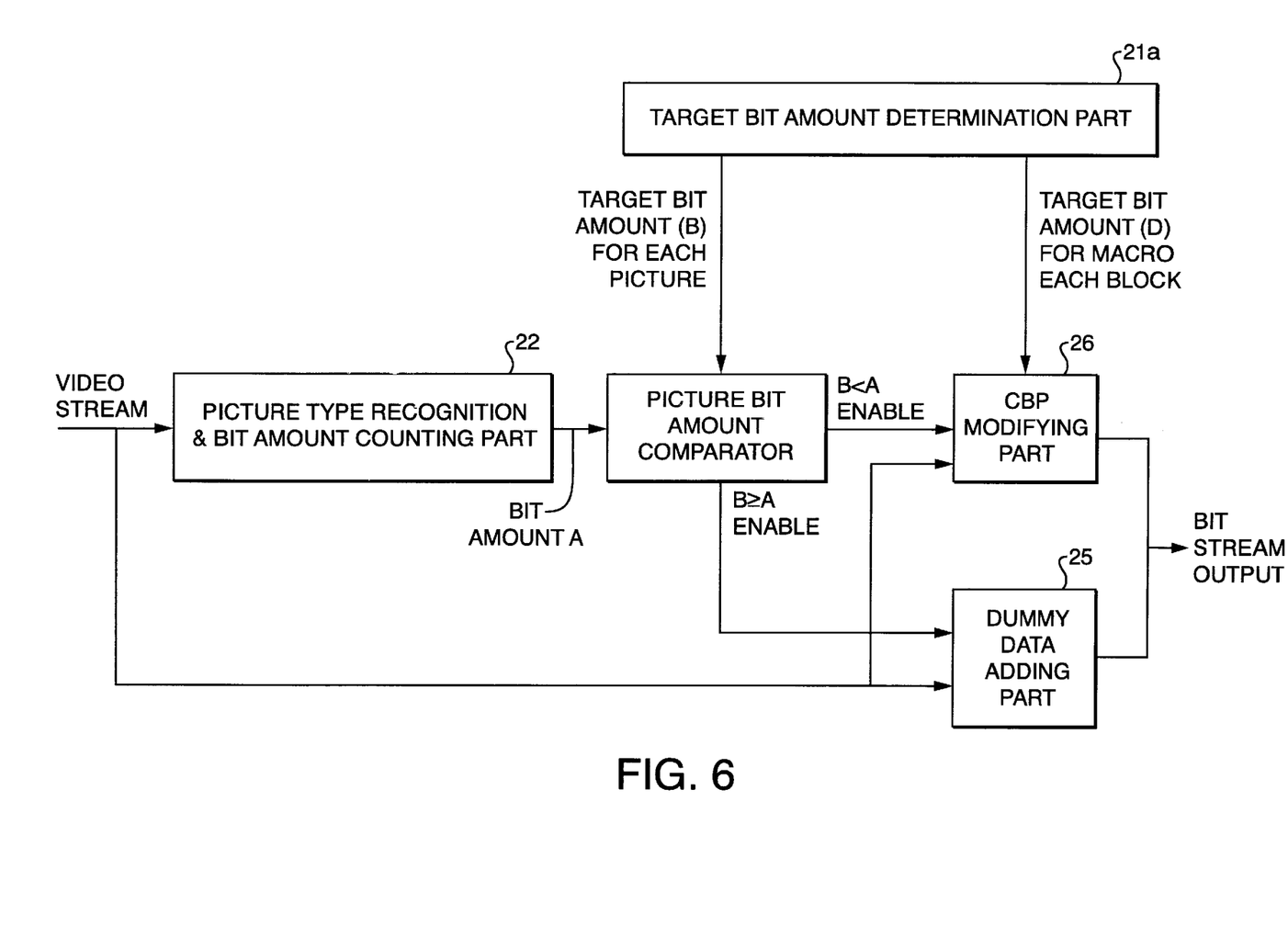
FIG. 6 is a schematic block diagram showing the details of the picture data encoding apparatus of the present invention.
Figure 7:
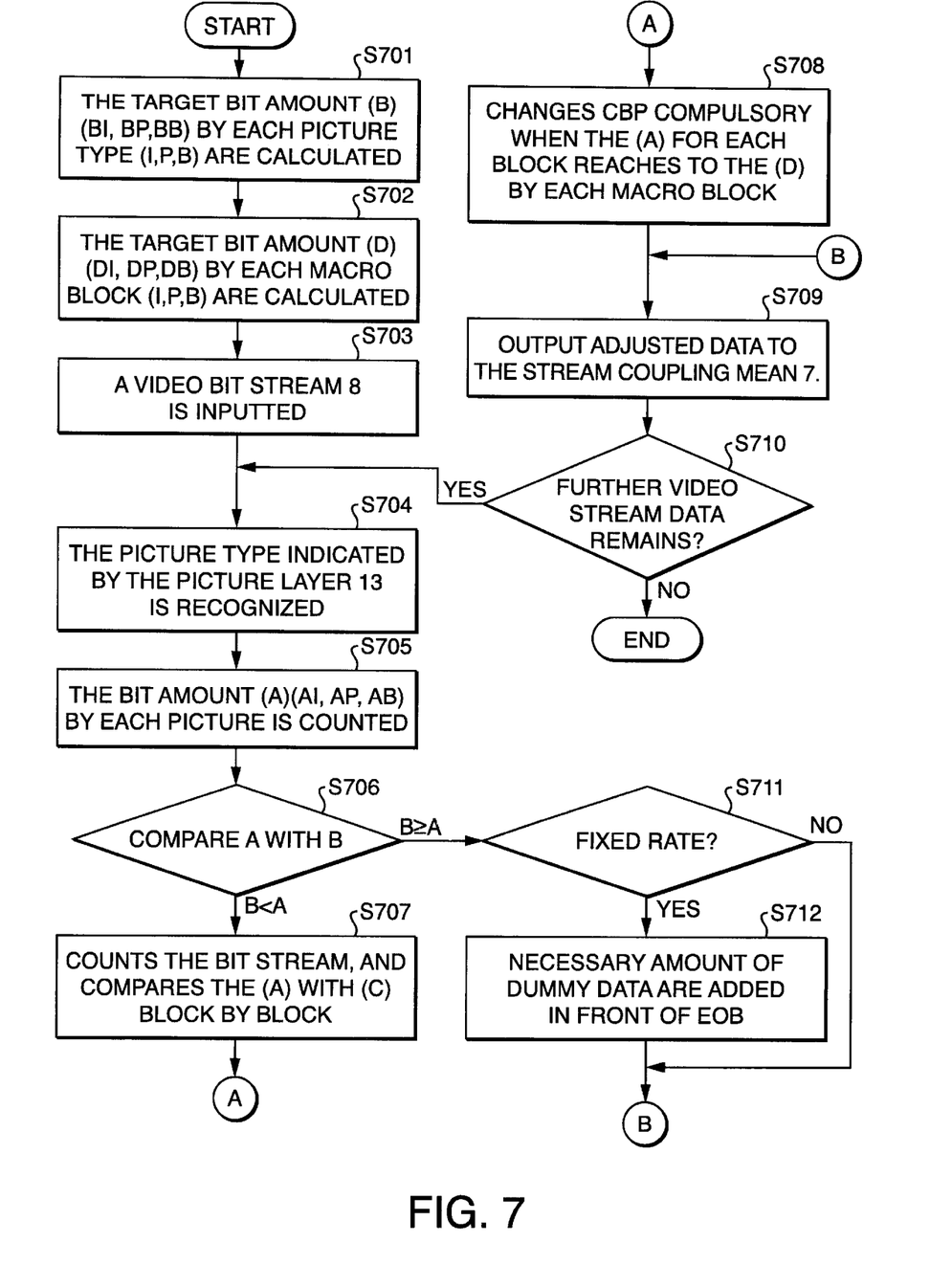
FIG. 7 is a flow chart showing a procedure of the picture data encoding apparatus of the second embodiment.

FIG. 6 is a schematic block diagram showing a detail element of the picture data encoding apparatus of the present invention. FIG. 7 is a flow chart showing a procedure of the picture data encoding apparatus of the second embodiment.

In this FIG. 6, 21a indicates a target bit amount determination part, 22 indicates a picture type recognition & bit amount counting part, 23 indicates a picture bit amount comparator, 26 indicates a CBP modifying part, 25 indicates a dummy data adding part. In this FIG. 6, the same number is assigned to the component which has the same function as that of FIG. 2, and the description for those is omitted appropriately here. The target bit amount determination part 21a corresponds to the target bit amount determination means. The picture type recognition & bit amount counting part 22, the picture bit amount comparator 23, the CBP modifying part 26 and the dummy data adding part 25 correspond to the bit amount adjustment means.

The target bit amount determination part 21a inputs the bit rate information of the receiver media 2 in advance, calculates and preserves the following set of information for each picture type. One is a target bit amount (B) (BI, BP, BB) for each macro block, the other is a target bit amount (D) (DI, DP, DB) for each macro block.

The CBP modifying part 26 turns to enable status when A>B in the comparison processing by the picture bit amount comparator 23. The CBP modifying part 26 counts the bit amount of the bit stream by each macro block, compares the counted bit amount with the macro block target bit amount (D). When the counted bit amount reaches to the macro block target bit amount (D), the CBP modifying part 26 changes the CBP compulsory, and deletes the data of which CBP has been changed.

Regarding the picture type recognition & bit amount counting part 22, the picture bit amount comparator 23 and the dummy data adding part 25 are the same as that of the Embodiment 1.

FIG. 7 is a flow chart showing a procedure of the picture data encoding apparatus of the second embodiment.

In step S701, the target bit amount (B) (BI, BP, BB) by each picture type (I, P, B) are calculated by the target bit amount determination part 21a based on the bit rate information for the receiver media 2.

Next, the target bit amount (D) (DI, DP, DB) by each macro block of each picture type (I,P,B) are calculated by the target bit amount determination part 21a (step S702). Here, the target bit amount D (DI, DP, DB) by each macro block is calculated by following (Equation 4) to (Equation 6).

$$DI=BI/\{(\text{horizontal macro block number})\times(\text{vertical direction macro block number})\} \quad \text{[Equation 4]}$$

$$DP=BP/\{(\text{horizontal macro block number})\times(\text{vertical direction macro block number})\} \quad \text{[Equation 5]}$$

$$DB=BB/\{(\text{horizontal macro block number})\times(\text{vertical direction macro block number})\} \quad \text{[Equation 6]}$$

The same as Embodiment 1, it is possible to perform the above-mentioned step S701–S702 in advance as a preprocessing.

Because the process of step S703 to step S706 are the same as step S303 to step S306 of the flow chart shown by FIG. 2 described in Embodiment 1, description for these steps are omitted appropriately.

As a result of the comparison processing in step 706, when B<A, an enable signal is outputted to the CBP modifying part 26 because the bit amount reducing process will be required. The process of step shifts to step 707.

In step 707, bit stream data, an enable signal and the target bit amount (D) (DI, DP, DB) by the macro block according to the picture type are inputted to the CBP modifying part 26. The CBP modifying part 26 counts the flowing bit stream, and compares the counted bit amount with the target bit amount (D) macro block by macro block.

In step 708, the CBP modifying part 26 changes CBP compulsory when the counting bit amount of the macro block reaches to the target bit amount D by each macro block. By this processing, data in the following block will be deleted and the amount of the coded data can be adjusted by each macro block unit. The video stream 8 can be converted with the bit rate for the receiver media 2.

In step 709, the processed data after bit amount adjustment are outputted to the stream coupling mean 7. If there remains further video stream data to be processed, return to step 704. If there is no data to be processed, the process will be finished (step S710).

On the other hand, if $B \geq A$ as a result of the comparison in step 706, the corresponding step will be the same step 311 to step 312 of the flow chart shown by FIG. 3 described in Embodiment 1, description here is omitted appropriately here.

By the above mentioned step 701 to step 712, the bit rate of the encoded data can be converted to the bit rate for the receiver media 2 by the simple processing without decoding and re-encoding the encoded data.

Embodiment 3

Hereinafter, a picture data encoding apparatus of the Embodiment 3 of the present invention will be described with reference to the accompanying drawings. Regarding the bit amount adjustment means described in this embodiment 3, a macro block is selected as a processing unit, and a run level information of the Huffman code table is utilized for adjusting the bit amount for each code.

Figure 8:
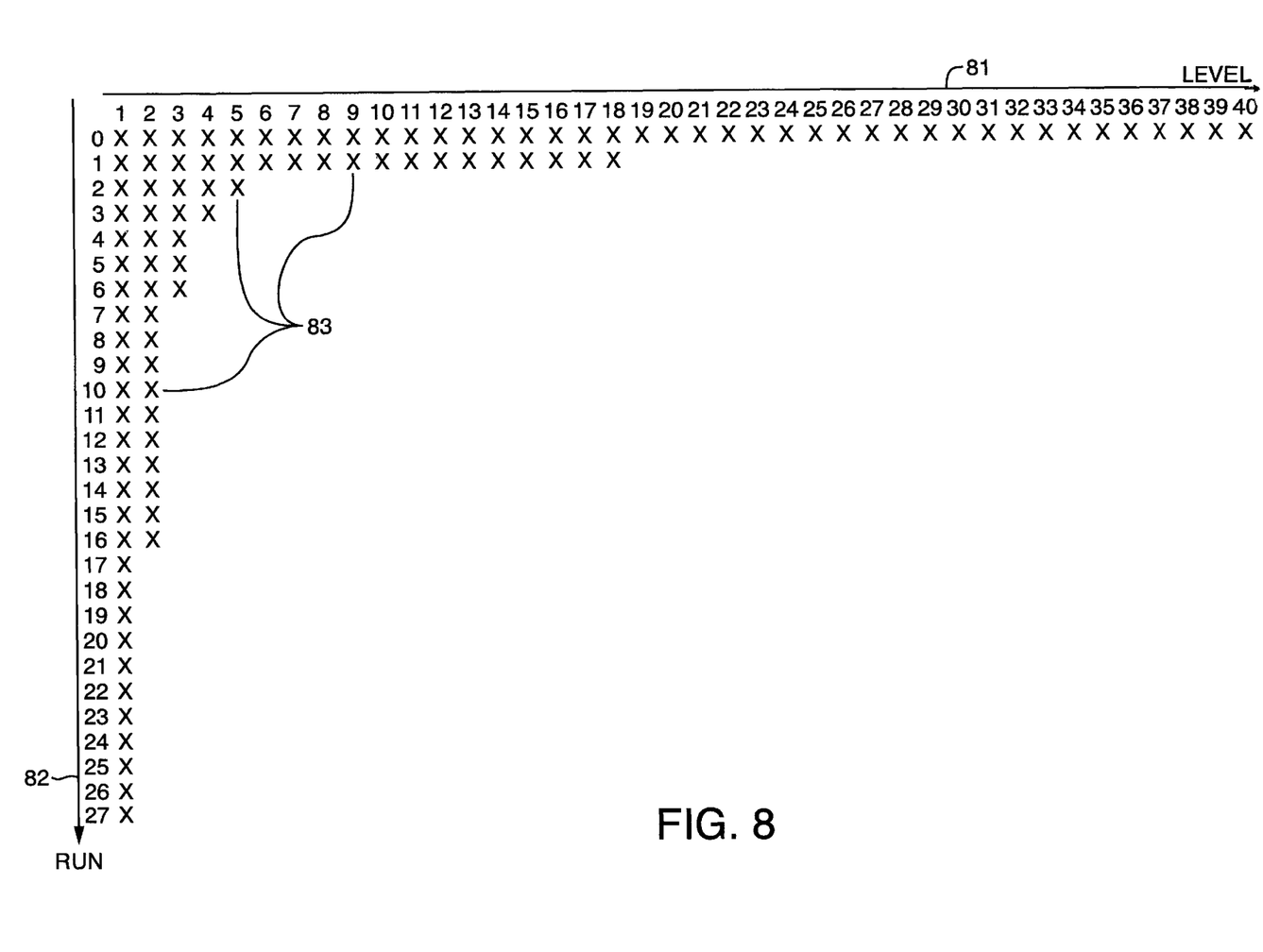
FIG. 8 is a schematic diagram showing a typical example composition of the table of Huffman code used in MPEG etc.

First of all, the run level information of the Huffman code table is described. FIG. 8 is a schematic diagram showing a typical example composition of the table of Huffman code used in MPEG etc. In FIG. 8, the horizontal axis 81 indicates level, the vertical axis indicates run, the positions 83 shown by "X" symbol are the positions where the Huffman code are allotted. The position except for the position marked with "X", the Huffman code is not assigned. For example, in MPEG 2, 6 bits ESC code "000001", 6 bits run data and 12 bits level data are used for encode data for those position.

As a typical example of the code for Huffman code at MPEG2 are as follows:

The code for RUN 6, LEVEL 3 is "0000 0000 0001 0100 0"

The code for RUN 6, LEVEL 2 is "0000 0001 1110 0"

The code for RUN 6, LEVEL 1 is "0000 1100"

As shown above, the smaller the LEVEL is, the smaller the assigned bit amount of code is.

In the same manner, if the LEVEL is the same value, the smaller the RUN is, the smaller the assigned bit amount of code is.

The bit amount adjustment means of this Embodiment 3 utilizes the run level information of the Huffman code encoding in order to reduce the encoded data of the block by lowering run level information (RUN LEVEL) for a code to lower run level information (RUN-M, LEVEL-N) when total bit amount is beyond the target bit amount (where, both M and N is integer more than 1). By this way, the bit amount can be adjusted by the macro block unit and the whole bit amount of the video stream 8 can be adjusted as a result.

Figure 9:
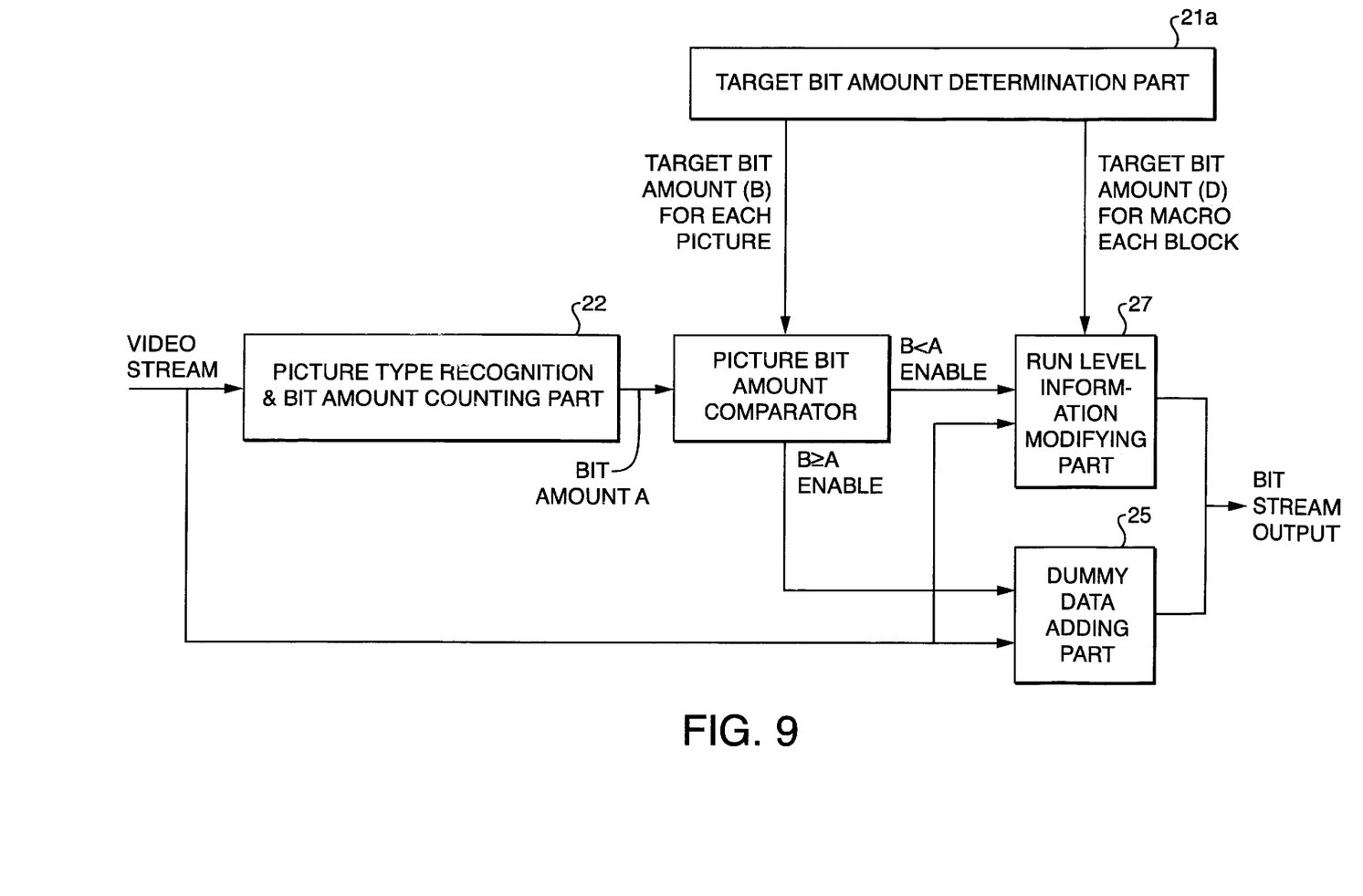
FIG. 9 is a schematic block diagram showing the details of the picture data encoding apparatus of the third embodiment.

FIG. 9 is a schematic block diagram showing the details of the picture data encoding apparatus of the third embodiment. In this FIG. 9, 21a indicates a target bit amount determination part, 22 indicates a picture type recognition & bit amount counting part, 23 indicates a picture bit amount comparator, 27 indicates a run level information modifying part, 25 indicates a dummy data adding part. In this FIG. 9, the same number is assigned to the component which has the same function as that of FIG. 2, or FIG. 6, and the description for those is omitted appropriately. The target bit amount determination part 21a corresponds to the target bit amount determination means. The picture type recognition & bit amount counting part 22, the picture bit amount comparator 23, the run level information modifying part 27 and the dummy data adding part 25 corresponds to the bit amount adjustment means.

The run level information modifying part 27 turns to enable status when A >B in the comparison processing by the picture bit amount comparator 23. The run level information modifying part 27 counts the bit amount of the bit stream by each macro block, compares the counted bit amount with the macro block target bit amount (D). When the counted bit amount reaches to the macro block target bit amount (D), the run level information modifying part 27 lowering the run level (RUN LEVEL) information for each code to lower run level information compulsory, and reduces the bit amount. Regarding the picture type recognition & bit amount counting part 22, the picture bit amount comparator 23 and the dummy data adding part 25 are the same as that of the Embodiment 1.

Example method for lowering the run level information, level information has priority to be lowered. For example, in run level lowering process from (RUN, LEVEL) to (RUN–M, LEVEL–N), the process starts from M=0 and N is increased 1 by 1 for bit amount adjustment, in case further lowering is required even though the LEVEL reaches to 1, then M is increased 1 by 1. For example, as shown in FIG. 8, according to MPEG 2, the variable length encoding data for RUN 6 LEVEL 3 is "0000 0000 0001 0100". In case the bit amount of a macro block by this variable length encoding code for RUN 6, LEVEL 3 beyond the target bit amount (D), the run level information is lowered to RUN 6 LEVEL 2 (lowering by M=0, N=1).

In this case, according to MPEG 2, the variable length encoding code becomes "0000 0001 1110", the bit amount is reduced by 4 bits for each code. In case the bit amount of the macro block beyond the target bit amount (D) regardless of the LEVEL information lowering by "1", the level information is further lowered to RUN6 LEVEL 1 (lowering by M=0, N=2). Further bit amount reducing is required, the LEVEL already reaches "1". Therefore, RUN information will be lowered. The run level information is lowered to RUN 5, LEVEL 1 (lowering by M=1, N=2). As shown above, the level information is lowered first, then the run information is lowered if necessary. By this method, the bit amount of the macro block is reduced within the target bit amount (D) by lowering the run level information.

Figure 10:
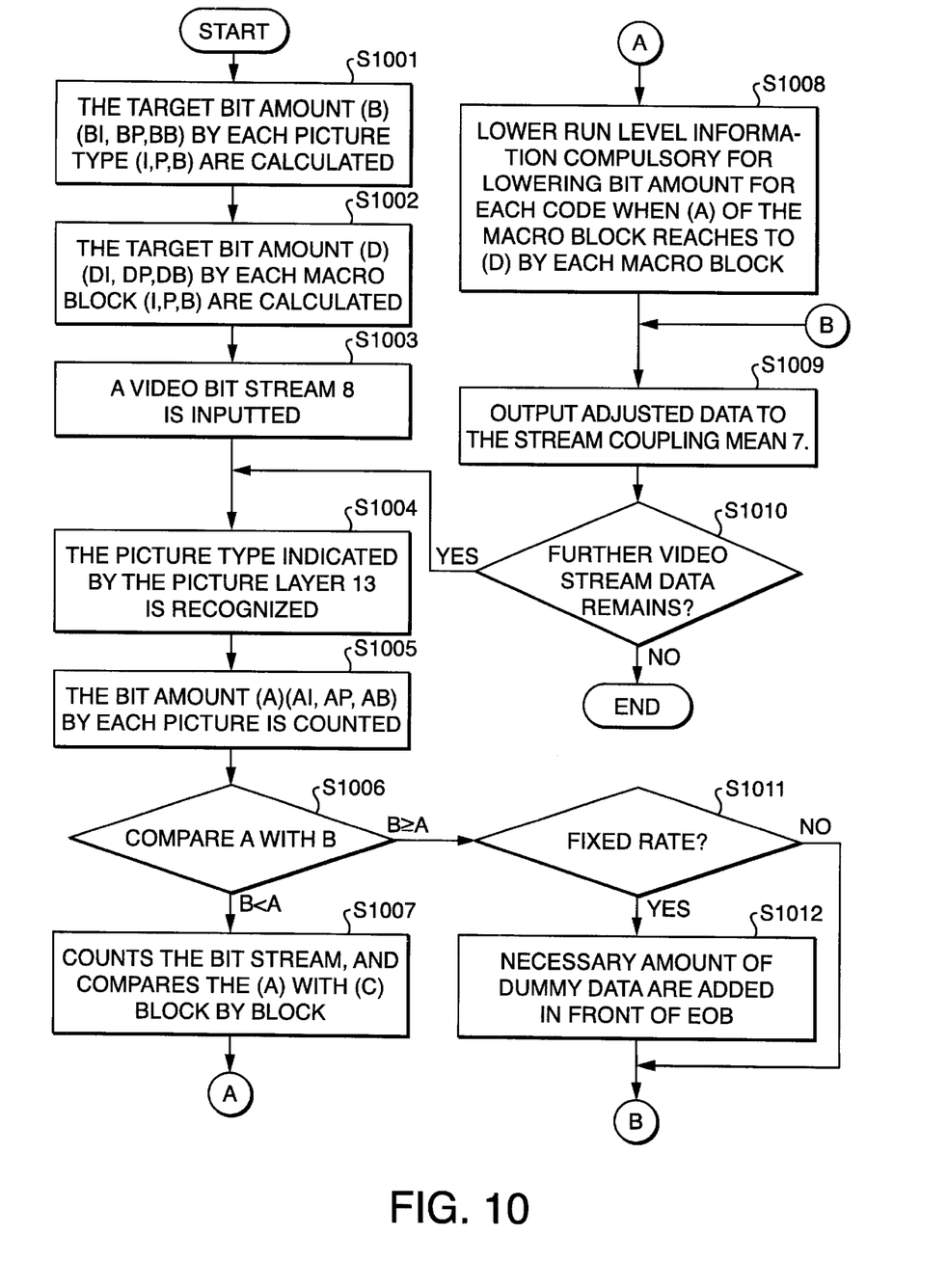
FIG. 10 is a flow chart showing a procedure of the picture data encoding apparatus of the third embodiment.

FIG. 10 is a flow chart showing a procedure of the picture data encoding apparatus of the third embodiment.

Because the process of step S1001 to step S1006 are the same as step S701 to step S706 of the flow chart shown by FIG. 7 described in Embodiment 2, description for these steps are omitted appropriately here.

As a result of the comparison processing in step 1006, when B<A, an enable signal is outputted to the run level modifying part 27 because the bit amount reducing process will be required. The process of step shifts to step 1007.

In step 1007, bit stream data, an enable signal and the target bit amount D (DI, DP or DB) by the macro block according to the picture type are inputted to the run level modifying part 27. The run level modifying part 27 counts the flowing bit stream, and compares the counted bit amount with the target bit amount (D) macro block by macro block.

In step 1008, the run level modifying part 27 lowers the run level information compulsory for lowering bit amount for each code when the counting bit amount of the macro block reaches the target bit amount (D) by each macro block. By this processing, the bit amount for each code is reduced, and the amount of the coded data can be adjusted by each macro block unit and converted to the video stream 8 with the bit rate for the receiver media 2.

In case the counted bit amount is not reduced enough to the target bit amount by the above mentioned step 1007 and step 1008, the bit amount adjustment means repeats the process flow step 1007 and step 1008 until the encoded bit amount becomes less than the target bit amount.

Regarding the output process for step 1009 and step 1010, these are the same as step S309 to step S310 of the flow chart shown by FIG. 3 described in Embodiment 1, description for these steps are omitted appropriately here.

Also, if B >A as a result of the comparison in step 1006, the corresponding step will be the same step 311 to step 312 of the flow chart shown by FIG. 3 described in Embodiment 1, description here is omitted appropriately here.

By the above mentioned step 1001 to step 1012, the bit rate of the encoded data can be converted to the bit rate for the receiver media 2 by the simple processing without decoding and re-encoding the encoded data.

Moreover, this bit amount adjustment process is applied only to the encoding code located in the vicinity of the EOB code which becomes a high frequency component, thus the picture quality can be kept high.

In the above description in this Embodiment 3, the process shown by the flow chart 10 set the target bit amount by macro block unit. However, the target bit amount can be set by block unit.

Moreover, the bit amount adjustment means of each above-mentioned Embodiment, if the bit amount adjustment for B picture is executed in prior to the bit amount adjustment for I picture and P picture, the picture quality can be kept high by assigning a lot of bit amounts to I and P picture. For this preferred embodiment, a target bit amount for B picture is calculated by following steps. The total bit amount of the I picture and the P picture is subtracted from the total bit amount of GOP depending on the bit rate of receiver media 2. The calculated bit amount is the available bit amount which can be assigned to the B picture as a target bit amount. An actual bit amount of the input data of B picture is reduced to the target bit amount by composing above-mentioned Embodiment 1 to 3.

As shown above, the picture data encoding apparatus according to the preferred embodiments of the present invention can adjust the transfer bit rate of the picture encoding data to the bit rate for receiver media by adjusting bit amount only with a simple system configuration.

The picture data encoding apparatus according to the preferred embodiments of the present invention can perform bit amount adjustment for each block by the bit amount adjusting means by utilizing EOB.

The picture data encoding apparatus according to the preferred embodiments of the present invention can perform bit amount adjustment for each macro block by the bit amount adjusting means by modifying CBP.

The picture data encoding apparatus according to the preferred embodiments of the present invention can perform bit amount adjustment for each block or for each block by the bit amount adjusting means by reducing the run level information.

The picture data encoding apparatus according to the preferred embodiments of this invention, when the bit rate is a fixed rate, and the bit rate for the receiver media is higher than the bit rate for sender media, the bit amount adjustment means can transfer the data by converting the variable rate encoding data into the fixed rate encoding data by adding the dummy data.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A picture data encoding apparatus comprising:

a target bit amount determining means for calculating a target bit amount for each block according to a bit rate and a number of blocks to be converted;

a bit amount adjusting means for reducing a bit amount for each block to the target bit amount by means of reducing the bit amount for each code by converting run level information for each code into lower run level information.

2. The picture data encoding apparatus according to claim 1 wherein the bit amount adjusting means performs bit amount adjustment only to the code in a vicinity of the end of block code.

3. The picture data encoding apparatus according to claim 2 wherein the bit amount is reduced by repeating processing of the bit amount adjusting means.

4. The picture data encoding apparatus according to claim 1 wherein the bit amount is reduced by repeating processing of the bit amount adjusting means.

5. The picture data encoding apparatus according to claim 1 wherein the target bit amount determining means calculates the target bit amount to bidirectionally predictive picture in order to achieve a converted bit amount using only the bidirectional predictive picture so as not to change the bit amount for an intraframe encoded picture and a predictive picture, and the bit amount adjusting means reduces only the bit amount of the bidirectionally predictive picture to the target bit amount for the bidirectionally predictive picture.

6. The picture data encoding apparatus according to claim 1, wherein when the bit rate is a fixed rate, and a bit rate for a receiver media is higher than the bit rate for a sender media, the bit amount adjusting means transfers the data by converting a variable rate encoded data into a fixed rate encoded data by adding dummy data.

7. A picture data encoding apparatus comprising:

a target bit amount determining means for calculating a target bit amount for each macro block according to a bit rate and a number of macro blocks to be converted;

a bit amount adjusting means for reducing a bit amount for each macro block to the target bit amount by means of reducing a bit amount for each code by converting run level information for each code into lower run level information.

8. A picture data encoding apparatus according to claim 7 wherein the bit amount adjusting means performs bit amount adjusting only to the code in a vicinity of the end of block code.

9. The picture data encoding apparatus according to claim 8 wherein the bit amount is reduced by repeating processing of the bit amount adjusting means.

10. The picture data encoding apparatus according to claim 8 wherein the target bit amount determining means calculates the target bit amount to bidirectionally predictive picture in order to achieve a converted bit amount using only the bidirectional predictive picture so as not to change the bit amount for an intraframe encoded picture and a predictive picture, and the bit amount adjusting means reduces only the bit amount of the bidirectionally predictive picture to the target bit amount for the bidirectionally predictive picture.

11. The picture data encoding apparatus according to claim 8, wherein when the bit rate is a fixed rate, and a bit rate for a receiver media is higher than the bit rate for a sender media, the bit amount adjusting means transfers the data by converting a variable rate encoded data into a fixed rate encoded data by adding dummy data.

12. The picture data encoding apparatus according to claim 7 wherein the bit amount is reduced by repeating processing of the bit amount adjusting means.

13. The picture data encoding apparatus according to claim 7 wherein the target bit amount determining means calculates the target bit amount to bidirectionally predictive picture in order to achieve a converted bit amount using only the bidirectional predictive picture so as not to change the bit amount for an intraframe encoded picture and a predictive picture, and the bit amount adjusting means reduces only the bit amount of the bidirectionally predictive picture to the target bit amount for the bidirectionally predictive picture.

14. The picture data encoding apparatus according to claim 7, wherein when the bit rate is a fixed rate, and a bit rate for a receiver media is higher than the bit rate for a sender media, the bit amount adjusting means transfers the data by converting a variable rate encoded data into a fixed rate encoded data by adding dummy data.

* * * * *